United States Patent [19]

Yoshioka et al.

[11] Patent Number: 5,200,875
[45] Date of Patent: Apr. 6, 1993

[54] PROTECTION STRUCTURE FOR A SURGE ABSORBER

[75] Inventors: Naruo Yoshioka; Fujio Ikeda; Takaaki Itoh, all of Saitama, Japan

[73] Assignee: Mitsubishi Materials Corporation, Tokyo, Japan

[21] Appl. No.: 798,531

[22] Filed: Nov. 26, 1991

[30] Foreign Application Priority Data

Nov. 27, 1990 [JP] Japan .................. 2-320899

[51] Int. Cl.⁵ .................. H02H 9/04; H01H 61/00
[52] U.S. Cl. .................. 361/56; 337/4; 337/15; 337/407
[58] Field of Search .................. 337/14–20, 337/28–34, 1, 2, 3, 4, 407; 361/54–59, 104, 106, 111

[56] References Cited

U.S. PATENT DOCUMENTS

| | | | |
|---|---|---|---|
| 4,168,514 | 9/1979 | Howell | 361/56 |
| 4,288,833 | 9/1981 | Howell | 337/16 |
| 4,292,617 | 9/1981 | McVey | 337/407 |

Primary Examiner—Harold Broome
Attorney, Agent, or Firm—McAulay Fisher Nissen Goldberg & Kiel

[57] ABSTRACT

A protective structure for a surge absorber which is composed of the surge absorber, connecting means for connecting the surge absorber to an electronic device and means for protecting the surge absorber as well as the electronic device from fire caused by a continuous overvoltage. The surge absorber protecting means is composed of a first electroconductive spring member which does not deteriorate from heat generated by repeated transient surge voltages to which it might be subjected. This spring member may be connected to a communication line and is movable between a first spring-loaded position wherein it connects the electronic device and the surge absorber to the communication line and a second non-spring loaded condition wherein the connection is broken. Also included are release means for releasing the first member from its first spring-loaded position which release means is activated by heat generated from a continuous overvoltage.

18 Claims, 2 Drawing Sheets

PROTECTION STRUCTURE FOR A SURGE ABSORBER

BACKGROUND OF THE INVENTION

I. Field of the Invention

This invention relates to a protection structure for a surge absorber applicable to electronic devices for communication systems, such as, telephone sets, facsimile machines, telephone switchboards, modem, etc. More particularly, it relates to a protection structure for a surge absorber which can absorb surge voltages applied to electronic devices and which can protect the latter from continuous overvoltages or overcurrents.

II. Description of the Related Art

A surge absorber of this type is parallel connected to a pair of communication lines of an electronic device and is designed to operate at a voltage higher than the operating voltage of the electronic device. When a voltage applied to such surge absorber is lower than a discharge starting voltage thereof, the device functions as a resistor having a high resistance. However, when the voltage applied to the surge absorber is higher than the starting voltage thereof, then the surge absorber changes into a resistor having a resistance lower than several tens of ohms in order to absorb the applied voltage. When a surge voltage, such as, a lightning bolt, is transiently applied to an electronic device, the surge absorber will discharge and absorb the surge voltage to thereby protect the electronic device. When an overvoltage or overcurrent (sometimes referred to herein collectively as overvoltage) is continuously applied to the circuit including the electronic device due to an accident, the electric current continuously flows through the surge absorber. As a result, the surge absorber is heated to a point which causes the surrounding electronic equipment to catch fire. Such accidents may occur when the power line of the electronic device contacts a communication line to which the electronic device is connected.

Under normal circumstances, such a continuous overvoltage or overcurrent is unlikely to enter the circuit, but the recent trend demands that the maximum precautions and safety measures be taken against contingent accidents. For instance, Underwriter's Laboratories Inc. in the USA has established a safety standard for surge absorbers to prevent them from causing fire or impulse on communication devices if an overcurrent or overvoltage enters continuously.

The present inventors have filed a patent application for a protection structure for a surge absorber as shown in FIG. 3 (PCT/JP90/01006) as the protection structure which satisfies the above mentioned safety standard and which can effectively prevent an electronic device catching fire due to a single prolonged overcurrent or overvoltage. The protection structure has a first lead 17, second lead 18 and third lead 19 provided on a base plate 16. One end of a metal wire 15 having a spring elasticity is welded to one end of the first lead 17. A surge absorber 14 is welded in between the second and the third leads 18 and 19 via lead wires 14a and 14b. The root of the lead wire 14a is soldered by a solder 28 to another end of the metal wire 15 which is bent toward the surge absorber 14. The metal wire 15 and the surge absorber 14 are housed in a casing 24 which in turn is attached to the base plate 16.

In the protection structure for the surge absorber as shown in FIG. 4, the lead 17 is connected to one of the communication lines 11a on the input side of an electronic device 10, the lead 18 is connected to one of the communication lines 11b on the input side of the device 10, and the lead 19 is connected to the other communication line 12.

In this protection structure, the metal wire 15 does not melt when a surge voltage is transiently applied. The metal wire 15 melts only when a large current having an overvoltage flows therethrough while the solder 28 melts when a small current having an overvoltage flows therethrough. When the solder 28 is fused, i.e., melted, the bent metal wire 15 is straightened by its spring elasticity to disconnect the circuit connected to the electronic device 10.

However, the protection structure mentioned above is defective in that if such surge voltage is repeatedly applied, the metal wire 15 is annealed by the accumulated heat and the spring elasticity is lost. Consequently, even if a small current having an overvoltage flows under conditions that fuse the solder 28, the tip end of the metal wire 15 does not spring back and remains connected to the root of the lead wire 14a. Thus, it fails to satisfy said safety standard.

SUMMARY OF THE INVENTION

An object of this invention is to provide a protection structure for a surge absorber which can absorb transient surge voltage, such as, lightning surges, and which can prevent not only abnormal heat generation, but also thermal damages and fire of electronic devices in the event they are subjected to continuous overvoltage or overcurrent.

The protection structure for the surge absorber according to this invention includes a surge absorber, means for connecting the surge absorber to an electronic device to protect the electronic device from transient surge voltages; and means for protecting the surge absorber and any electronic device connected thereto from a continuous overvoltage. The protecting means include a first electroconductive spring member, the spring properties of which do not deteriorate from heat generated by repeated transient surge voltages therethrough. The first member can be connected to a communication line and is movable between a first spring-loaded position and a second non-spring loaded position. The protective means also incudes a second electroconductive member for maintaining the first member in the first spring loaded position. When the spring member is in the first position, it connects the electronic device and the surge absorber to the communication line. When it is in the second, non-spring loaded position, such connection is broken. Also present are release means for releasing the first member from its first position, which is activated by heat generated from a continuous overvoltage.

More particularly, the surge absorber is connected to a pair of communication lines of an electronic device in parallel to the device. A first lead is connected to one of the lines on the input side of the electronic device, a second lead is connected to one of the lines on the input side of the electronic device, and a third lead is connected to the other line, the leads being mounted on a base member. One end of a metal strip having a spring elasticity is connected to the first lead by welding. The surge absorber is connected by welding between the second and third leads via lead wires. One end of a metal wire is connected by soldering to the root of the lead wire which is connected to the second lead. The metal strip at the other end is welded to the other end of the metal wire with the metal strip bent on a spring-loaded position toward the surge absorber (first spring-loaded position).

When a surge voltage is transiently applied, the metal wire does not melt, but the surge absorb will absorb the surge. When a large electric current having an overvoltage flows through the surge absorber, the metal wire melts, thus disconnecting the circuit. When a small current having an overvoltage flows, solder which secures the metal wire at one end thereof becomes fused or melted. When the solder is fused, the metal strip which is released and straightened to a non-spring loaded position (second position) to disconnect the circuit connected to the electronic device.

The surge absorber may include a surge absorber of the semiconductor type, such as, a zinc oxide varistor, a silicon carbide varistor, a Zener diode, a surge absorber of the filter type, such as, a CR filter made of a combination of a capacitor and resistor and a CL filter which is a combination of capacitor and coil, a gap-type surge absorber, such as, an air gap surge absorber and a microgap type surge absorber.

The term overvoltage or overcurrent used herein means an abnormal voltage which exceeds the discharge starting voltage of the surge absorber and accompanying abnormal current.

BRIEF DESCRIPTION OF THE DRAWINGS

The above and other objects and features of this invention will become more apparent from the description of a preferred example of this invention referring to the attached drawings wherein.

DESCRIPTION OF THE PREFERRED EMBODIMENT

Figure 1:
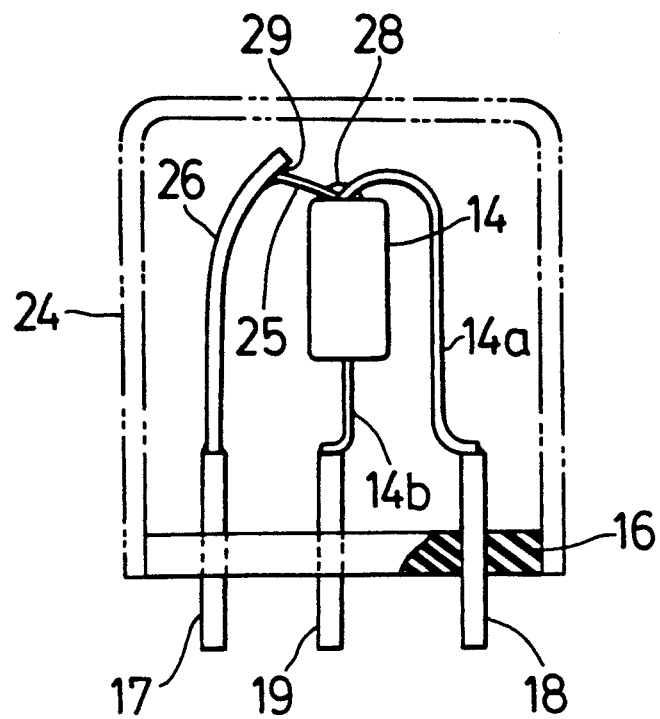
FIG. 1 is a front partially open view of an example of the protection structure for the surge absorber according to this invention.
Figure 2:
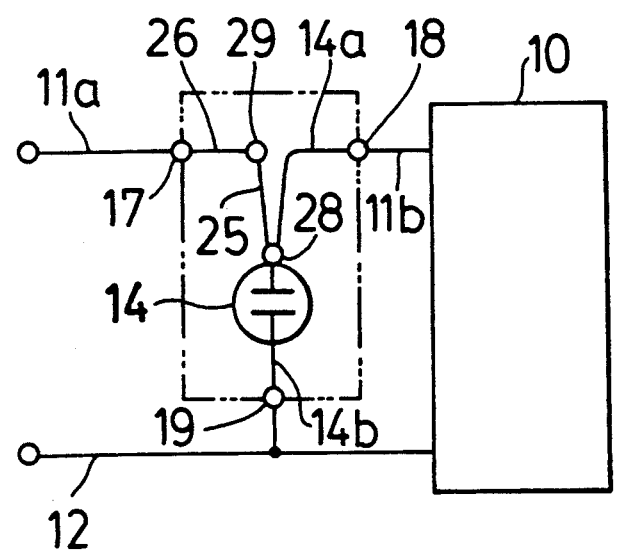
FIG. 2 is a circuit diagram thereof.

As shown in FIG. 2, a surge absorber 14 is connected to a pair of communication lines 11a, 11b and 12 of an electronic device 10 in a communication system in parallel thereto. As shown in FIG. 1, three leads 17, 18, 19 in the form of a pin penetrate through an insulating base plate 16 of the surge absorber at a regular interval. Leads 17 through 19 are made of a conductive material, such as, an alloy of iron and nickel as in this example. Lead 17 is connected to one of the lines 11a on the input side of the electronic device 10, lead 18 is connected to one of the lines 11b on the input side of the device 10, and lead 19 is connected to the other line 12.

In this example, the surge absorber is a microgap type surge absorber having a discharge starting voltage at 300 V. The surge absorber 14 is made by forming a micro-gap of several tens of micrometers in the circumferential direction of a cylindrical ceramic member coated with a conductive film, providing cap-like electrodes on both ends of the ceramic member, connecting the lead wires to the cap electrodes and sealing the same in a glass tube with an inert gas. Lead wire 14a of the surge absorber 14 is welded to lead 18 while lead wire 14b is welded to lead 19, respectively.

Metal strip 26 having spring elasticity is welded at one end thereof to lead 17 on the base plate 16. In this example, the metal strip 26 is formed as a plate and made of phosphor bronze having a melting point at 910° C. The cross-sectional area of the metal strip 26 is approximately six times the cross-sectional area of the metal wire 15 shown in FIG. 3. One end of a metal wire 25 is connected with solder 28 to the root end of the lead wire 14a connected to the lead 18. In this example, metal wire 25 is made of phosphor bronze having a melting point at 910° C. Its cross-sectional area is substantially the same as that of the metal wire 15 shown in FIG. 3. The metal strip 26 is maintained in a spring-loaded bent position toward the surge absorber and is connected at the other end to the other end of the metal wire 25 by weld 29. The metal strip 26, the metal wire 25 and the surge absorber 14 are housed in a casing 24 and the casing 24 is attached to the base plate 16.

The metal strip 26 has a cross-sectional area large enough so that it is not annealed from the heat generated when a surge is applied thereinto. Even when a low voltage surge continuously enters the surge absorber 14 to cause the surge absorber to generate heat, the metal strip 26 itself does not generate heat, but retains its spring elasticity. Metal wire 25 will melt when a large electric current having an overvoltage flows continuously through the surge absorber. The solder 28 is fused when a small current having an overvoltage flows continuously through the surge absorber. When either the metal wire 25 is melted or the solder 28 is fused, the bent metal strip 26 straightens from its spring elasticity out of its spring-loaded position.

COMPARATIVE EXAMPLE

Figure 3:
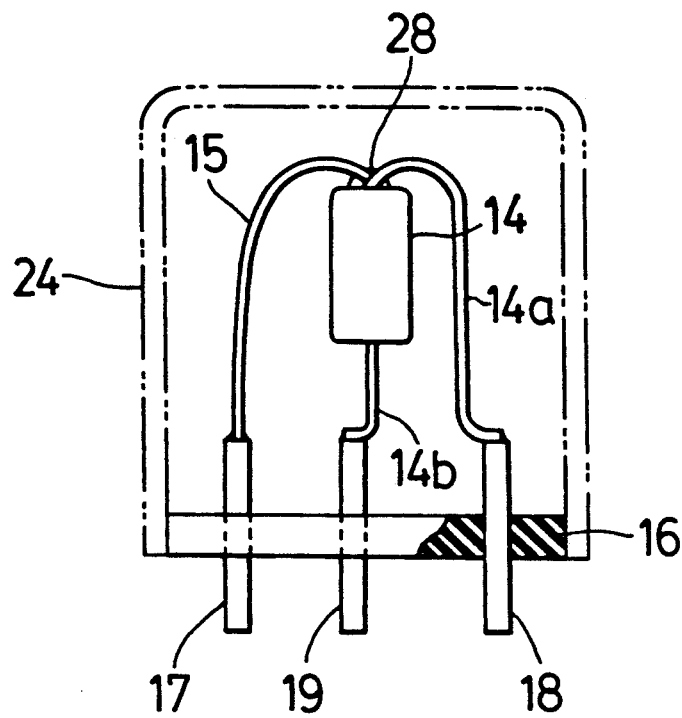
FIG. 3 is a front partially open view of a conventional protection structure for a surge absorber.
Figure 4:
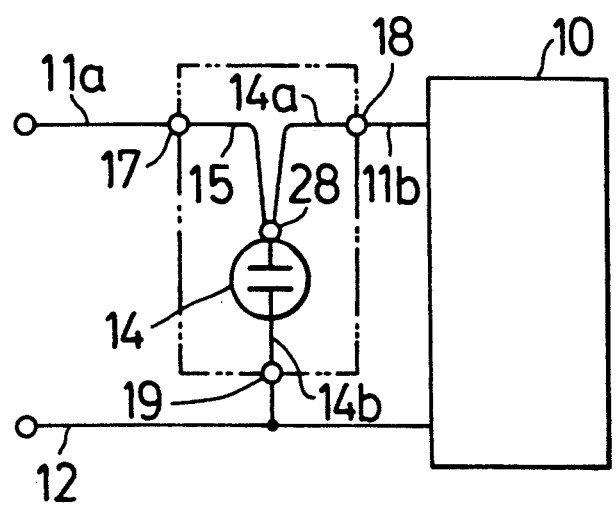
FIG. 4 is a circuit diagram thereof.

As shown in FIG. 3, the comparative example protection structure for a surge absorber differs from the example of this invention in that the metal wire 15 is directly connected at its tip end to the root of the lead 14a with solder 28 instead of using the metal strip 26. In FIG. 3, the same parts are denoted with the same reference codes as in FIG. 1. The example of the inventive protection structure and the comparative example protection structure were tested by repeatedly applying a simulated surge of 8×20 μs at the different currents listed in the Table below, 100 times. After application of the test surges, both protection structures for the surge absorber were subjected to an electric current of 0.25 A at AC 600 V for 30 minutes, and examined, for evidence of fire.

TABLE

| Simulated surge peak current | 200A | 300A | 400A | 500A | 600A |
|---|---|---|---|---|---|
| Example | no fire | no fire | no fire | no fire | no fire |
| Comparative Example | no fire | no fire | no fire | fire | fire |

As is obvious from the Table, when an overvoltage was applied after application of repeated surge voltages, no fire was observed in the example surge absorber according to this invention with amperages up to 600 A. The comparative example surge absorber, however, caught fire at 500 A and 600 A. When subjected to a surge of 700 A, both the metal wire 25 and the metal wire 15 of the protection structure according to this invention and the comparative example melted. The test demonstrated that the protection structure according to this invention has higher safety characteristics as compared to the prior device.

What is claimed is:

1. A protective structure for a surge absorber comprising:

means for connecting the surge absorber to an electronic device to protect the electronic device from transient surge voltages; and means for protecting the surge absorber and an electronic device connected thereto from a continuous overvoltage comprising:

a first electroconductive spring member, the spring properties of which do not deteriorate from heat generated by repeated transient surge voltages therethrough, having means for connection to a communication line and being movable between a first spring-loaded position and a second non-spring loaded position;

a second electroconductive member connecting the first spring member to the surge absorber for maintaining the first member in the first position;

the spring member connecting the electronic device and the surge absorber to the communication line when in the first position and disconnecting when in the second position;

release means activated by heat generated from a continuous overvoltage connecting the second member to the surge absorber for releasing the second member and the first member from its first position.

2. The protective structure of claim 1 wherein the electrical resistance of the first member is sufficiently low such that heat developed from a continuous overvoltage therethrough does not deteriorate the spring properties thereof.

3. The protective structure of claim 2 wherein the first and second members are composed of a metal or metal alloy.

4. The protective structure of claim 3 wherein the second member connects the first member to the electrical device and the surge absorber through the release means and has an electrical resistance sufficiently high such that it develops sufficient heat during the passage of a continuous overvoltage therethrough to activate the release means.

5. The protective structure of claim 4 wherein the second member is composed of the same metal or alloy as the first member, each of the first and second members have a rod shape and the cross-sectional area of the first member is about six fold that of the second member.

6. The protective structure of claim 4 wherein the release means is a solder securing the second member to the surge protector and the electrical device and which melts at the temperature reached by the second member when the second member is subjected to a continuous overvoltage thereby releasing the first member from contact with the electrical device and the surge protector.

7. The protective structure of claim 5 wherein the first and second members are formed from phosphor bronze having a melting point at 910° C.

8. The protective structure of claim 3 wherein the second member connects the first member to the electrical device and the surge absorber and has an electrical resistance sufficiently high such that it develops sufficient heat during the passage of a continuous overvoltage therethrough such that the second member melts thereby disconnecting the first member from the electrical device and the surge absorber.

9. The protective structure of claim 5 wherein the first member is in the form of a strip and the second member is in the form of a wire.

10. The protective structure of claim 1 wherein the surge absorber and means for protecting the surge absorber are enclosed within a chamber and the means for connecting the surge absorber to an electrical device and the means for connecting the first member to an electrical device are electrical leads extending exterior of the chamber.

11. A device for protecting a surge absorber and any electronic device connected thereto from a continuous overvoltage comprising:

a first electroconductive spring member, the spring properties of which do not deteriorate from heat generated by transient overvoltage therethrough, having means for connection to a power source and being movable between a first spring-loaded position and a second non-spring loaded position connecting the electrical device and the surge absorber when in the first position and in non-electrical contact when in the second position;

a second electroconductive member connecting the spring member to the surge absorber for maintaining the first member in the first position;

release means activated by heat generated from a continuous overvoltage connecting the second member to the surge absorber for releasing the second member and the first member from its first position.

12. The device of claim 11 wherein the electrical resistance of the first member is sufficiently low such that heat developed from a continuous overvoltage therethrough does not deteriorate the spring properties thereof.

13. The device of claim 12 wherein the second member connects the first member to the electrical device and the surge absorber through the release means and has an electrical resistance sufficiently high such that it develops sufficient heat during the passage of a continuous overvoltage therethrough to activate the release means.

14. The device of claim 11 wherein the first and second members are composed of a metal or metal alloy.

15. The device of claim 14 wherein the second member is composed of the same metal or alloy as the first member, each of the first and second members have a rod shape and the cross-sectional diameter of the first member is about six fold that of the second member.

16. The device of claim 15 wherein the release means is a solder securing the second member to the surge protector and the electrical device and which melts at the temperature reached by the second member when the second member is subjected to a continuous overvoltage thereby releasing the first member from contact with the electrical device and the surge protector.

17. The device of claim 14 wherein the first and second members are formed from phosphor bronze having a melting point at 910° C.

18. The device of claim 13 wherein the second member connects the first member to the electrical device and the surge absorber and has an electrical resistance sufficiently high such that it develops sufficient heat during the passage of a continuous overvoltage therethrough such that the second member melts thereby disconnecting the first member from the electrical device and the surge absorber.

* * * * *